April 25, 1967     J. CARNESECCA, JR., ET AL     3,315,532
CYLINDER EXTENSION COUPLING DEVICE
Filed Sept. 18, 1964                               2 Sheets-Sheet 1
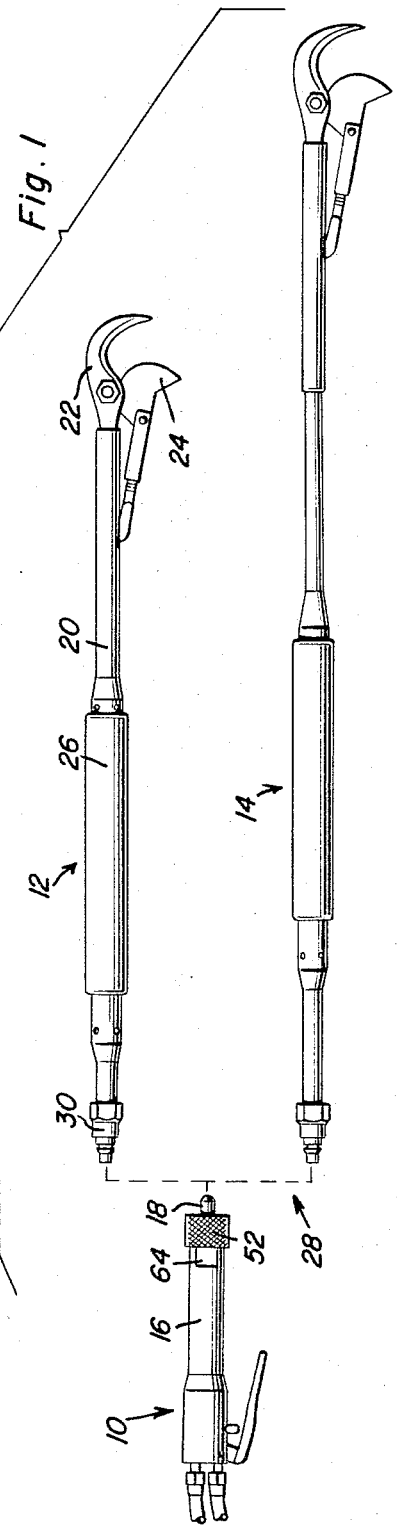
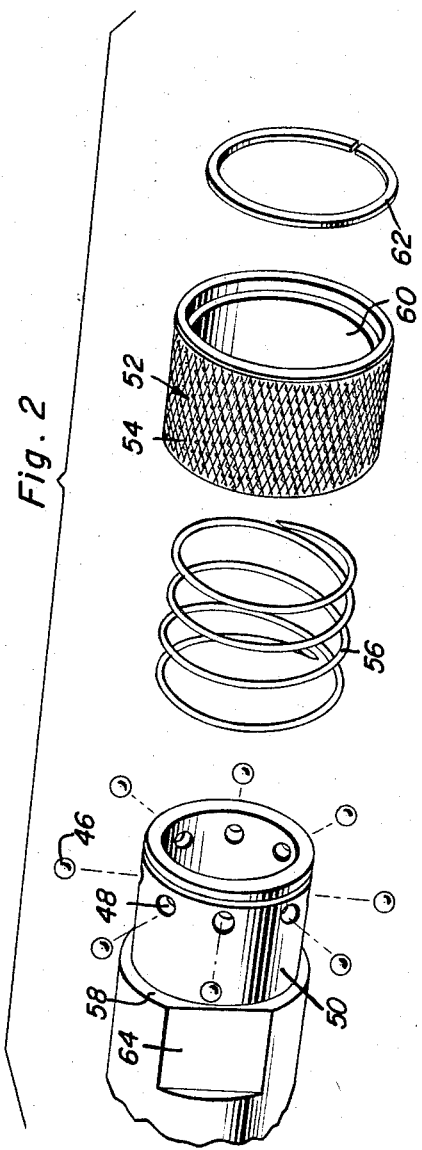
Joseph Carnesecca, Jr.
Egidio C. Carnesecca
           INVENTORS

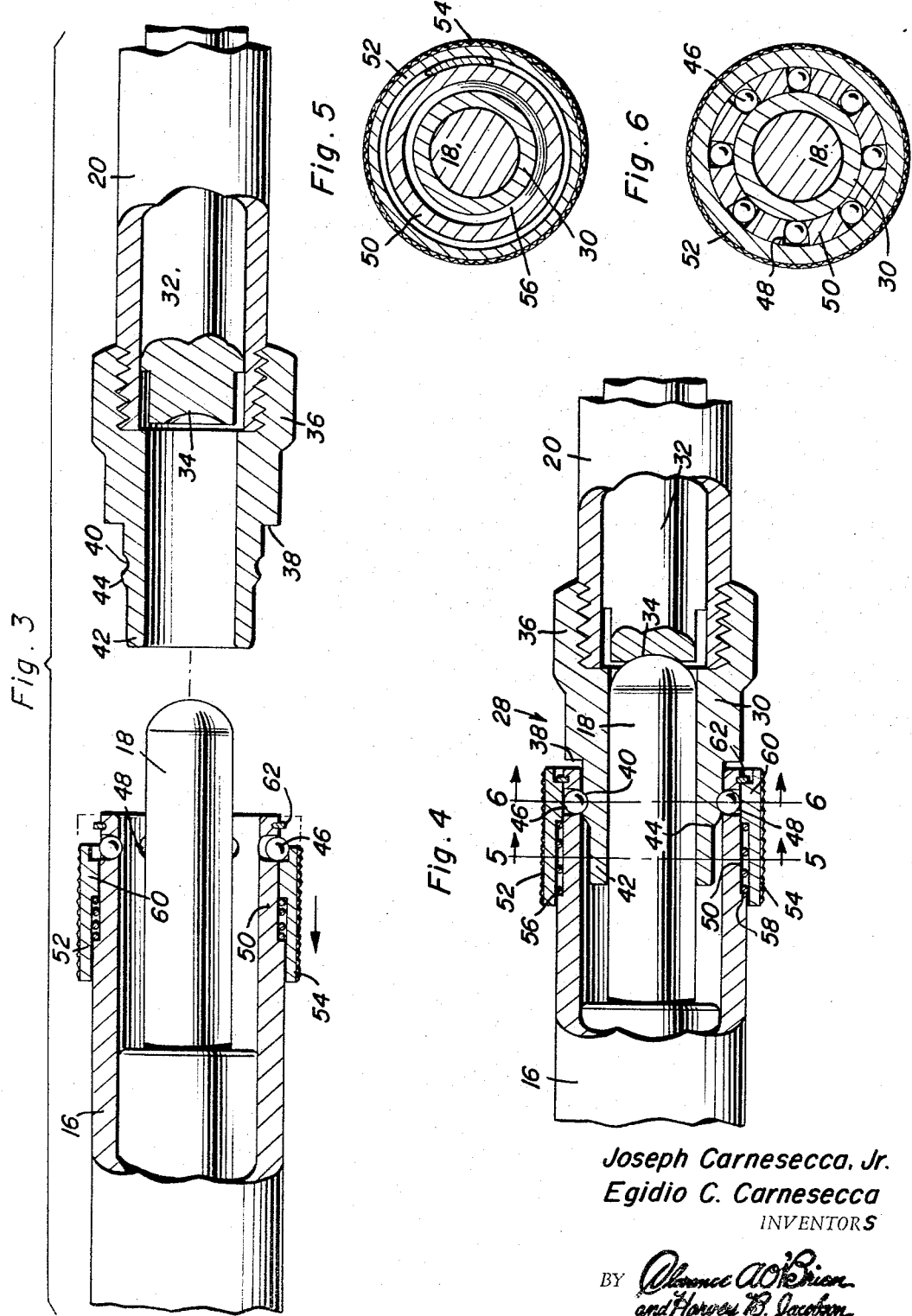

United States Patent Office 3,315,532
Patented Apr. 25, 1967

3,315,532
CYLINDER EXTENSION COUPLING DEVICE
Joseph Carnesecca, Jr., and Egidio C. Carnesecca, both of R.F.D. 1, Springville, Utah 84663
Filed Sept. 18, 1964, Ser. No. 397,496
3 Claims. (Cl. 74—1)

This invention relates to a rotatable coupling device of the disconnectable type adapted to be utilized in connection with fluid power operated tools, such as disclosed in prior copending application, U.S. Ser. No. 203,604, filed June 19, 1962, now Patent No. 3,236,156.

It is a primary object of the present invention to provide facilities whereby an effective coupling may be rapidly established between extension tools and a fluid power operator. In particular, the coupling device of the present invention enables the use of a fluid piston type of cylinder device with tools of different lengths such as the power pruning tools disclosed in the aforementioned prior copending application.

In accordance with the foregoing object, an additional object of the present invention is to provide a disconnectable coupling between an open end of the cylinder device and an elongated tubular member through which a reciprocable tool operating member extends. The tubular member is thereby rotatably mounted relative to the cylinder device about its longitudinal axis and in fixed axial spaced relation to the cylinder device so that the piston element projecting from the cylinder device may engage an end face of the operating member in order to operate the tool to which the operating member is connected. Power operated tools, such as the pruning tools disclosed in the aforementioned copending application are thereby rendered more versatile in use since one fluid power operator may be utilized in connection with tools of different lengths for different work requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a fluid power operator alternatively useable with pruning tools of different lengths.

FIGURE 2 is a prospective view of some of the disassembled parts of the coupling device of the present invention.

FIGURE 3 is a side sectional view of the coupling device prior to interconnection of the fluid power operator with the tool.

FIGURE 4 is a side sectional view of the coupling device interconnecting the power operator with the tool.

FIGURE 5 is a transverse sectional view taken substantially through a plane indicated by section line 5—5 in FIGURE 4.

FIGURE 6 is a transverse sectional view substantially taken through a plane indicated by section line 6—6 in FIGURE 4.

Referring now to the drawings in detail, it will be observed from FIGURE 1, that a single fluid power operator generally referred to by reference numeral 10 may be alternatively coupled to tool assemblies 12 and 14 of different lengths. The fluid power operator is of the type disclosed in the prior copending application aforementioned and includes an open end cylinder member 16 from which a piston rod element 18 projects. The tool assemblies are also of the type disclosed in the prior copending application aforementioned including an elongated tubular member 20 to which a fixed pruning blade 22 is connected at one end for cooperation with a movable pruning blade 24. A grip element 26 may be mounted on the elongated tubular member. Thus, the tool assembly is coupled to the fluid power operator device 10 so that the piston element 18 projecting therefrom may operate the movable pruning blade 24 while at the same time, the tubular member 20 may be rotated about the common longitudinal axis extending through the tool assembly and the fluid power operator.

Referring now to FIGURE 4, the disconnectable coupling device by means of which the fluid power operator is coupled to the tool assembly, is generally denoted by reference numeral 28. The coupling device includes a tubular bearing element 30 secured to the elongated tubular member 20 at its end opposite the end to which the pruning tool blades are connected. The tubular member 20 therefore slidably mounts a reciprocable operating rod member 32 operatively connected at one end to the movable pruning blade 24 and provided at its other end with an end face 34 engaged by the projecting end of the piston rod element 18. Accordingly, reciprocating movement of the piston element will be imparted through the operating rod member 32 to the movable pruning blade 24 for operation thereof. The tubular bearing element 30 therefore extends into the open end of the cylinder member 16 and slidably receives therethrough the projecting piston rod element 18. The bearing element 30 is provided with an enlarged, internally threaded portion 36 by means of which it may be threadedly secured to the end of the tubular member 20. The portion of the bearing element 30 projecting into the cylinder member 16 extends from the annular shoulder 38 and includes an annular bearing groove 40. The annular groove 40 is spaced from a forward, reduced diameter portion 42 by a camming portion 44 by means of which a plurality of ball bearing elements 46 may be cammed radially outwardly.

The ball bearing elements 46 are carried by the cylinder member 16 within a plurality of circumferentially spaced apertures 48 disposed in spaced relation to the open end of the cylinder device. The cylinder device is therefore provided with a reduced diameter portion 50 adjacent the open end thereof within which the apertures 48 are located and through which the tubular bearing element 30 is received so as to bring the annular groove 40 into axial alignment with the apertures 48. Slidably mounted on the reduced diameter portion 50, is a bearing sleeve element 52 having an externally knurled surface 54. The sleeve 52 is biased to the position illustrated in 54 by means of coil spring 56 which is seated on the reduced diameter portion 50 and reacts between the shoulder 58 on the cylinder member and the annular bearing surface portion 60 of the sleeve. The sleeve is therefore held in axially assembled relation on the portion 50 of the cylinder member by an annular thrust ring 62 received within a groove formed in the portion 50 of the cylinder member adjacent the open end thereof. In the position illustrated in FIGURE 4, the bearing surface portion 60 prevents radially outward displacement of the ball bearing elements 46 so as to axially lock the cylinder member and elongated tubular member 20 to which the tubular element 30 is connected. The tubular member 20 will however be rotatable about the longitudinal axis of the piston element 18 and accommodate slidable movement of the piston element for operation of the tool through the operating rod member 32.

When the sleeve element 52 is yieldably retracted against the bias of the coil spring 56 as shown in FIGURE 3, the ball bearing elements 46 will be released against radially outward displacement in order to permit disconnection or coupling of the cylinder device to the tool assembly. The sleeve element may be limited in rearward retraction by the formation of flats on the cylinder member as more clearly seen in FIGURES 1 and 2.

The procedure for coupling the power device 10 to a tool assembly will be apparent from the foregoing description. Accordingly, the sleeve element 52 will be retracted to the position shown in FIGURE 3 so as to permit radially outward displacement of the elements 46. The tubular bearing element 30 may then be inserted, the cam portion 44 radially displacing the elements 46 outwardly until the annular groove 40 is axially aligned therewith in order to receive the elements. The sleeve element is then released so as to bring the bearing portion 60 thereof into axial alignment with the ball bearing elements 46 in order to lock the assembly. Uncoupling of the device is also achieved in a simple manner by merely retracting the sleeve element 52 and withdrawing the tubular bearing element 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a cylinder device having a power operated piston element projecting from an open end thereof, an elongated tubular member, a tool element mounted on one end of said tubular member, a reciprocable operating member slidably mounted in said tubular member and connected to said tool element, said operating member having an end face engageable by the piston element adjacent the other end of the tubular member, and disconnectable coupling means rotatably mounting said other end of the tubular member in axially fixed relation to the open end of the cylinder device for guided projection of the piston element into engagement with said end face.

2. The combination of claim 1 wherein said coupling means comprises, an inner bearing element connected to the other end of the tubular member having a guide portion slidably receiving the piston element within the cylinder device, an annular groove formed on said inner bearing element in axial spaced relation to said end face of the operating member, said cylinder device being provided with circumferentially spaced seating apertures spaced from the open end for axial alignment with said annular groove, a plurality of axial locking elements carried in said apertures and received in said annular groove, and retractable sleeve means slidably mounted on said cylinder device at the open end having an internal bearing surface preventing radially outward displacement of the locking elements to hold the locking elements in the annular groove.

3. In combination with a cylinder device having a power operated piston element projecting from an open end thereof, an elongated tubular member, a tool element mounted on one end of said tubular member, a reciprocable operating member slidably mounted in said tubular member and connected to said tool element, said operating member having an end face engageable by the piston element adjacent the other end of the tubular member, means rotatably mounting the tubular member within the cylinder device including an inner race element secured to the other end of the tubular member in slide bearing contact with said piston element, an outer race element operatively mounted on the cylinder device adjacent said open end, bearing means carried by the cylinder device in contact with the inner and outer race elements to lock the cylinder device and tubular member in axially fixed relation to each other, and means for retracting the outer race element to release the bearing means from axial locking engagement with the inner race element.

References Cited by the Examiner
UNITED STATES PATENTS

| | | | |
|---|---|---|---|
| 2,075,341 | 3/1937 | Goodman | 30—228 |
| 2,504,405 | 4/1950 | Fletcher | 30—228 X |
| 2,751,940 | 6/1956 | Miller | 30—228 X |
| 3,139,762 | 7/1964 | Alfieri | 74—110 |
| 3,229,996 | 1/1966 | Cadwell | 285—277 X |

FRED C. MATTERN, JR., *Primary Examiner.*

F. E. BAKER, H. C. COE, *Assistant Examiners.*